Feb. 22, 1966    B. ECK ET AL    3,236,215
INTERNAL COMBUSTION ENGINE HEAT EXCHANGER SYSTEMS
Filed Sept. 5, 1962    4 Sheets-Sheet 1

INVENTORS
BRUNO ECK
BY NIKOLAUS LAING
ATTORNEYS

Feb. 22, 1966   B. ECK ET AL   3,236,215
INTERNAL COMBUSTION ENGINE HEAT EXCHANGER SYSTEMS
Filed Sept. 5, 1962   4 Sheets-Sheet 4

INVENTORS
BRUNO ECK
NIKOLAUS LAING
BY Pennie Edmonds,
Morton, Taylor & Adams
ATTORNEYS

United States Patent Office 3,236,215
Patented Feb. 22, 1966

3,236,215
INTERNAL COMBUSTION ENGINE HEAT EXCHANGER SYSTEMS
Bruno Eck, Cologne-Klettenberg, and Nikolaus Laing, Stuttgart, Germany, assignors, by mesne assignments, to Laing Vortex, Inc., New York, N.Y.
Filed Sept. 5, 1962, Ser. No. 221,624
Claims priority, application Germany, Dec. 7, 1956, L 26,393, L 26,394
8 Claims. (Cl. 123—41.05)

This application is a continuation-in-part of application Serial No. 701,266, filed December 6, 1957, now abandoned.

This invention relates to internal combustion heat exchanger systems and more particularly to heat exchanger systems which may be used either with air-cooled or liquid-cooled internal combustion engines.

The advantages of eliminating liquid circulation from internal combustion engines are recognized but heretofore it has been difficult to provide an adequate cooling air supply in order to cool the engine under all working conditions and to cool the cylinders of the engines equally. Air-cooled internal combustion engines have been used which utilize a single blower and ducting to provide the throughput necessary to cool the engine and to convey the throughput past the various cylinders of the engine. Power losses in the ducting and non-uniform air distribution to the cylinders at all but one condition of engine loading have been characteristic drawbacks of conventional air-cooled engines.

In conventional liquid-cooled engines, it has been customary to place a heat exchanger, i.e., the radiator, in the path of the air passing over a vehicle when it is in motion and to supplement this air by an axial flow type fan driven by the engine. At low vehicle speeds and high engine speeds, as in climbing a hill, the fan provides the major part of the cooling air flow and the engine cooling system is usually designed to meet these conditions. By contrast, at average vehicle speeds, the power absorbed in pushing the heat exchanger through the air is much greater than needed to produce sufficient air flow through the heat exchanger and the power consumed by the fan is, to a large extent, wasted. A further difficulty of conventional liquid-cooling systems is the difficulty of matching the cross-sectional area of the fan with the cross-sectional area of the heat exchanger. In conventional installations the heat exchanger is rectangular while the cross-sectional area of the fan is circular, so that the corners of the heat exchanger will have the cooling air passing through it at a lower velocity than at other areas resulting in uneven cooling of the exchanger.

It is therefore an object of the invention to provide for a cooling system which may be applied to air-cooled engines and which when applied to air-cooled engines, will provide uniform air flow over all of the cylinders of the engine.

Broadly, when applied to an air-cooled engine, the invention comprises a cylindrical bladed rotor mounted for rotation about its axis wherein the blades of the rotor have their outer edges leading their inner edges in the direction of rotation, and guide means to induce on rotation of the rotor a flow of air twice through the blades of the rotor in a direction perpendicular to the roto axis to cause the throughput of the rotor to pass against heat-dissipating surfaces contained on the cylinders of an engine. The rotor will normally be driven from the engine crankshaft. A rotor as set out above and various guide means for directing the flow of air within the rotor are disclosed and described in copending application Serial No. 671,114, filed July 5, 1957.

The advantage of a rotor as described is that it can be as long or as short as desired without changing the pattern of air flow along its length. The rotor may therefore be arranged opposite the engine cylinder or cylinders with its axis parallel to the crankshaft and this arrangement can be applied to engines having one or more banks of cylinders such as straight 4's, flat 4's and V-8's where the rotor is made substantially the same length as the bank of cylinders to which it is to supply air. The air will then pass between the cylinders and rotor without appreciable deflection in the direction of the rotor axis except where it flows past the individual cylinders. The air supplied to the cylinders will have a uniform velocity over all cylinders of the bank at all engine speeds and the air will not be subjected to any changes in direction which would involve energy loss except in its passage around the individual cylinders. The change in flow direction in the rotor when the air passes therethrough is not attended with losses of the type which air subjected to when passing through bends contained in ducting. The flow past the individual cylinders will be attendant with random eddy currents calculated to improve heat transfer conditions which will involve some pressure loss. This loss, however, may be compensated for by placing a diffuser downstream of the rotor.

Advantages of the system outlined above are the ease with which the rotor throughout can be controlled while the engine runs at a constant speed and the fact that the rotor uses less power with increased throttling in contrast with conventional fans such as axial flow fans which require more power to rotate the fan when it is throttled. Forms of the invention thus contemplate including a throttling means such as a butterfly valve positioned in a diffuser downstream of the rotor or of utilizing throttling plates with holes that can be brought into or out of registry in order to control throughput of the system. The throttling means may be operated manually or automatically by a thermostat and are such that they will not interfere with the uniformity of flow along the length of the rotor.

A further embodiment of the invention is to position the rotor opposite the cylinders and approximately parallel to the cylinder axis. For multi-cylinder engines, this arrangement requires one rotor for each cylinder, though if the engine is the type having twin opposed cylinders, then a common shaft may suffice to mount the two rotors required to cool the cylinders. This arrangement also has the important advantage over conventional air-cooled engines in that even cooling of all cylinders can be obtained at all engine speeds.

All the arrangements mentioned above have the advantage of easy throttling and of a rotor power consumption which is dependent upon throughput as contrasted with conventional systems wherein the fan power consumption is usually constant notwithstanding throughput.

The heat exchanger systems for air-cooled engines described above can also provide for heating of the vehicle in a number of ways. In one embodiment an auxiliary rotor of the type described above can be mounted on the same shaft with the cooling air rotor to blow air over an exhaust manifold were both rotors are parallel to the engine crankshaft.

Various embodiments of the invention are diagrammatically illustrated in the accompanying drawings in which.

Figure 1:
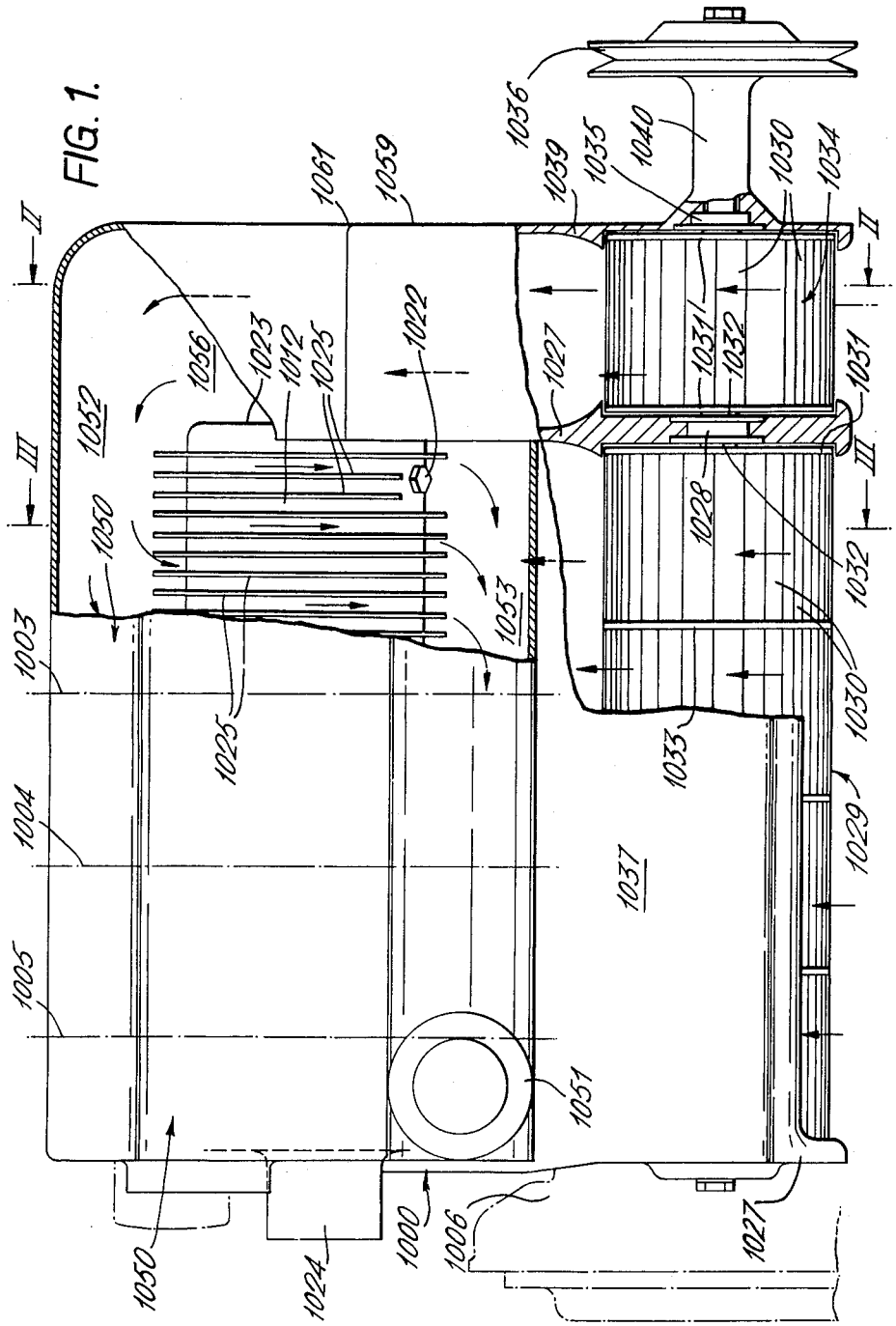
FIG. 1 is a partial side elevational view of a 4-cylinder in-line internal combustion engine having an air-cooling system constructed according to the invention.
Figure 2:
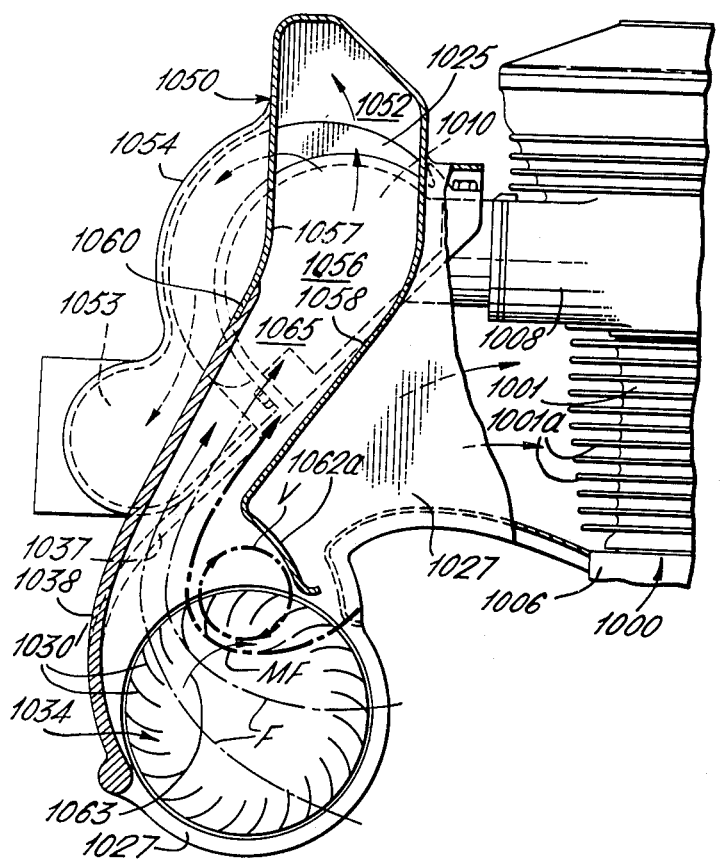
FIG. 2 is a cross-sectional view of the engine of FIG. 1 taken along lines II—II.
Figure 3:
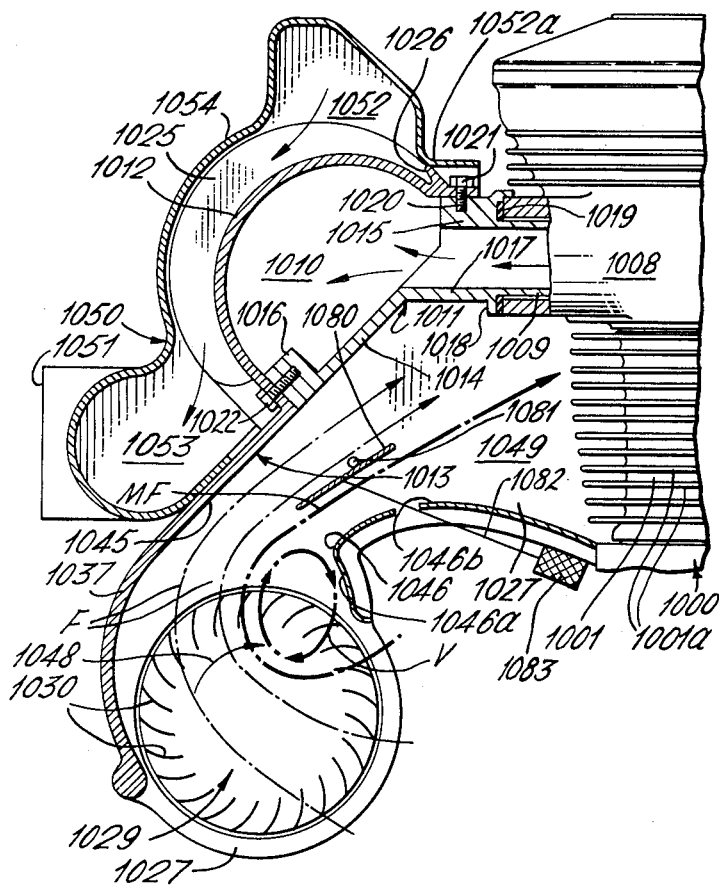
FIG. 3 is a cross-sectional view of the engine of FIG. 1 taken along lines III—III of FIG. 1.
Figure 4:
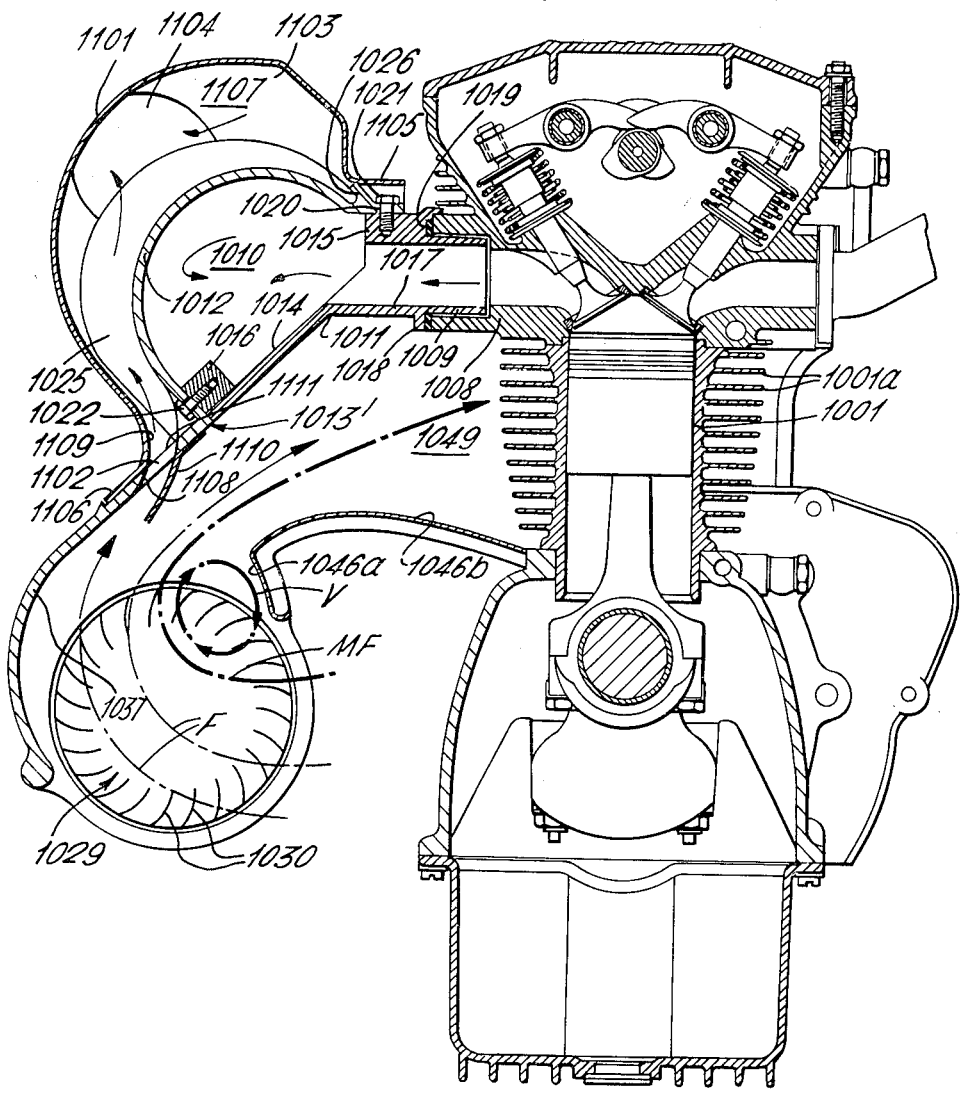
FIG. 4 is a cross-sectional view of an in-line internal combustion engine having a different embodiment of air-cooling system than in FIG. 1.

Referring to FIGS. 1 to 3 of the drawing, the engine there shown and designated generally 1000 comprises four similar cylinders 1001 arranged in line with their axes in a common vertical plane. One cylinder has its axis on the section plane indicated at III—III while the axes of the others are indicated at 1003, 1004 and 1005. The crankcase block and flywheel casing 1006 are not illustrated in detail as their construction forms no part of the present invention. It is to be understood however that the crankshaft (not shown) has its axis horizontal in the vertical plane of the cylinder axes and that the cylinders 1001 are mounted individually on the crankcase block. It will be seen that the engine is shown broken away at the right of FIGS. 2 and 3, and it is to be understood that such parts as are not shown are of conventional construction and form no part of the present invention. Fig. 4 shows piston, crankshaft, and crankcase details as well as an induction pipe and valves, and the parts omitted in FIGS. 1 to 3 may be constructed as illustrated in FIG. 4.

Each cylinder 1001 has an exhaust outlet 1008 in the form of a tube with a counter bore 1009. The outlets 1008 discharge into a manifold designated generally 1010 formed by a lower manifold casting 1011 and an upper manifold portion 1012 bolted thereto and forming part of another casting designated generally 1013, as will be described further below. The lower manifold casting 1011 provides a generally rectangular plate 1014 which extends downwardly and away from the outlets 1008 and terminates at top and bottom in flanges 1015 and 1016. Four tubular connections 1017 project from the plate so as to enter the counter bores 1009, while flanges 1018 on the connections serve to clamp individual annular gaskets 1019 against the end faces of the outlets 1008. It will be understood that the lower manifold casting 1011 is tighened against the cylinders 1001 by means not shown and that the pressure so produced is taken on the baskets 1019.

The upper manifold portion 1012 has the approximate form of a semi-cylinder with a flange 1020 along one side which mates with, and is secured by bolts 1021 to the upper flange 1015 on the lower manifold casting 1011. The other side of the manifold portion 1012 mates with, and is secured by bolts 1022 to the lower flange 1016 on the casting 1011. An end wall 1023 (FIG. 1) closes one end of the manifold 1010 and an exhaust connection 1024 is provided at the other. The manifold portion 1012 carries closely spaced radial fins 1025 which are united adjacent the flange 1020 by means of a continuous lip 1026.

The casting 1013 providing the upper manifold portion 1012 provides also a pair of main transverse walls 1027 embracing the four cylinders 1001 and extending therefrom to the side where the exhaust manifold 1010 is situated, each transverse wall mounting a bearing 1028. Between the walls 1027 and by means of the bearings 1028 a main blower rotor 1029 is mounted for rotation about a horizontal axis parallel to the crankshaft axis and somewhat below the level of the top of the crankcase block 1006. The main blower rotor 1029 comprises a series of similar sheet metal rotor blades 1030 arranged in a ring and running parallel to the rotor axis between a pair of supporting end discs 1031 carrying stub-shafts 1032 received in the bearings 1028. The blades are stiffened by discs 1033 spaced at equal intervals and aligned with the interspacer between the cylinder 1001. The stub-shaft 1032 seen at the right in FIG. 1 is connected to a secondary blower rotor 1034 of the same diameter as, and axially aligned with, the main rotor 1029. The secondary rotor comprises blades 1030' secured between supporting end discs 1031', which elements are similar to those of the main rotor, except for the length of the blades. The stub-shaft 1032 has its right-hand end connected to the left-hand disc 1031' while the right-hand disc 1031' is secured to a shaft 1035 mounting a pulley wheel 1036 adapted for connection to the engine crankshaft by means of a V-belt (not shown) which may also drive a dynamo (not shown). The rotors 1029 and 1034 along with stub-shafts 1032, shaft 1035 and pulley wheel 1036 form a rigid assembly rotating together as a unit.

The casting 1013 provides also a main longitudinal wall 1037, a secondary longitudinal wall 1038 and a secondary transverse wall 1039 parallel to the main transverse walls, the secondary longitudinal wall being aligned with the right hand end disc 1031' of the secondary rotor, the main and secondary longitudinal walls extending over the lengths of main and secondary rotors 1029 and 1034 respectively and uniting the transverse walls. The secondary transverse wall 1039 carries an extension 1040 in which is journalled the shaft 1035.

The main longitudinal wall 1037 of the casting 1013 joins the upper manifold portion 1012 at a right angle (FIG. 3) so as to lie flush with the lower face of the plate 1014 whereby the wall 1037 and plate 1014 present towards the rotor 1029 a continuous guide surface 1045. A second guide surface 1046 is provided by a rectangular piece of sheet metal bent to the shape illustrated in FIG. 3 and located between the transverse walls 1027 with one longitudinal edge against the crankcase block 1006. The guide surface 1046 has a portion 1046a defining a gap converging with the rotor 1029 in the direction of rotor rotation as shown by the arrow 1048 and a further portion 1046b merging with the portion 1046a and forming with the guide surface 1045 a diffuser 1049. At their lines of nearest approach to the lower rotor both guide surfaces 1045 and 1046a are well spaced therefrom.

In operation the rotor 1029 and guide surface portion 1046a co-operate to set up a cylindrical vortex having a core region indicated at V which is eccentric to the rotor axis and guides air twice through the rotor blades 1030 in a direction at right angles to the rotor axis, as shown by the flow lines F and MF. The velocity of air flow near the vortex core V as shown by the flow line MF is greater than the velocity remote therefrom. This flow of greater velocity remote therefrom. This flow of greater velocity detaches itself from the surface 1046b and, being somewhat reduced in velocity due to mixing and to the effect of the diffuser 1049, impinges on the cylinders 1001 at about their head. Although the head is subjected to the most powerful cooling, there is air flow distributed over the whole height of the cylinders 1001. The cylinders are finned as shown at 1001a, which, while it assists heat dissipation by providing a greater surface area to the air also produces a resistance thereto. The air pressure rises somewhat in the diffuser 1049 so as to be able to overcome this resistance.

The construction and operation of the rotor 1029 and guide surface portion 1046a has been dealt with summarily in the foregoing because a full description is given with reference to later figures.

To control the rotor throughput and hence the cooling of the engine a sheet metal butterfly valve 1080 is pivotally mounted on a spindle 1081 extending parallel to the rotor axis within the diffuser 1049. An actuating rod 1082 connects the valve 1080 to a bellows-type heat sensitive element 1083 arranged near the engine crankcase (or alternatively in the oil circulation). When the engine cools the valve 1080 pivots to closed position; when the engine heats the valve opens. The valve 1080 is illustrated in the fully open position.

As previously explained, throttling the rotor throughput reduces the power consumption of the rotor, so that it becomes convenient to provide excess cooling capacity and operate in the normally throttled condition.

A sheet metal cowling designated generally 1050 is mounted over the manifold 1010 and secondary rotor 1034 to convey air therefrom over the manifold to an outlet connection 1051 whereby air, heated by the manifold, can be ducted to the interior of a vehicle mounting the engine 1000. The cowling 1050 provides in combination with the outer surface of the upper exhaust manifold portion 1012 a pair of headers 1052 and 1053 extending the length of the manifold 1010 with header 1052 being above the manifold and header 1053 below and to one side of the manifold and with the header 1052 having an out-turned flange 1052a sealing against the lip 1026 on the upper manifold portion. The upper header 1052 receives air from the rotor 1034 as will be described later. This air then passes down between the fins 1025 on the manifold portion 1012, guided by the part-cylindrical surface thereof and a similarly-shaped portion 1054 of the cowling 1050 which interconnects the parts thereof defining the headers 1052 and 1053. Air which has passed the fins 1025 is collected in the lower header 1053 and conveyed to the connection 1051 located thereon.

The upper header 1052 extends over the rotor 1034 and merges into a duct portion 1056 leading towards it. Duct portion 1056 is formed by opposed side walls 1057 and 1058 and an interconnecting end wall 1059 with the side wall 1057 fairing into the secondary longitudinal wall 1038 at a lap joint 1060 therewith and with the end wall 1059 fairing into the secondary transverse wall 1039 at a joint 1061, while the side wall 1058 extends down to the rotor. The side wall 1058 presents to the rotor a guide surface 1062a convergent therewith in the direction of rotor rotation as shown by the arrow 1063. The rotor 1034 operates in conjunction with the guide surface 1062a in the same way as the rotor 1029 and surface 1046a with the air flow being indicated by the flow lines V, F and MF which have the same significance as in the previous description. The wall 1058 provides a further guide surface 1062b which merges with the surface 1062a and defines with the walls 1038 and 1057 a diffuser 1065 wherein the air pressure increases to overcome the resistance of the ducting to the vehicle interior.

It should be noticed that the joints of the manifold 1010 are so constructed that any leakage therefrom discharges into the engine-cooling air where it is dissipated harmlessly, rather than into the vehicle-heating air where the carbon monoxide present would constitute a danger to the occupants of the vehicle.

It will also be seen that the arrangement is compact; that the cooling air is directed over the whole of each cylinder but chiefly at the head where most heat has to be removed; that the only change in direction of the cooling air between the rotor 1029 and final discharge thereof is due to the presence of the cylinders themselves so that resistance in minimized and what there is helps the removal of heat from the surfaces of the cylinders; and that the cooling of the engine and heating of the vehicle is obtained by a single rotatable unit comprising blowers 1029 and 1034 which can be driven by an existing V-belt.

FIGURE 4 shows an engine 1100 somewhat similar to that of FIGS. 1 to 3 both as regards the engine itself and the cooling arrangements and the same references will be used for parts in the FIG. 4 construction which correspond to those previously described. It should be noted that the FIG. 4 construction contains no equivalent to the secondary blower rotor 1034 and associated ducting previously described and that the cowling 1101 of the FIG. 4 construction differs markedly from that of earlier figures. The exhaust manifold 1010 is however the same as before and the various parts of the casting 1013' of FIG. 4 are the same as those of the casting 1013 except for such changes as are consequent upon elimination of the rotor 1034, and the provision of slots 1102 to be described.

The cowling 1101 in FIG. 4 extends over the manifold 1010 with constant arcuate cross-section between a first end wall (not shown) aligned with one end of the manifold and a second end wall 1103 aligned with the other end of the manifold and containing an outlet 1104 for connection to the interior of the vehicle. The cowling 1101 carries uninterrupted upper and lower flanges 1105 and 1106 running the length of the manifold 1010 with the lower flange 1106 overlying and being secured to the wall 1037 in spaced relation to the lower side of the manifold and the upper flange 1105 making sealing contact with the lip 1026. The slots 1102 are formed in the wall 1037 adjacent the manifold 1010 so as to lead air which has passed the blower rotor 1029 into the space 1107 between the upper manifold portion 1012 and the cowling 1101. The lower sides 1108 of the slots 1102 are curved and cooperate with a curved transition portion 1109 at the root of the lower flange 1106 to provide a smooth guide surface for air into the space 1107. A sheet metal deflector 1110 runs the length of the manifold inside wall 1037 and fairs into the upper sides 1111 of the slots 1102 to provide a smooth second guide surface opposite that previously mentioned. As the deflector 1110 projects into the air stream from the rotor 1029 a proportion of that stream is deflected thereby and guided by the surfaces mentioned into the space 1107.

The FIG. 4 construction has the same advantages as that of FIG. 1.

We claim:

1. A multi-cylinder internal combustion engine having at least one bank of finned cylinders in line and a crankshaft, and further comprising a cylindrical bladed rotor mounted for rotation about an axis parallel to the crankshaft, extending over substantially the same length as said bank and situated directly opposite thereto, said rotor having a series of blades arranged in a ring about said axis and extending longitudinally thereof with their outer edges leading their inner edges in the direction of intended rotation, means to rotate the rotor, guide means to induce on rotation of the rotor a flow of air twice through the blades of the rotor in a direction transverse to said axis and to cause at least a major part of the throughput of the rotor to pass directly between said bank and said rotor without substantial deflection in the direction of said axis except as required to get past the cylinders of the bank.

2. An engine as claimed in claim 1, including means to throttle the throughput of the rotor.

3. An engine as claimed in claim 1, said guide means cooperating with said rotor to set up a flow at the exit of said rotor wherein certain flow lines have markedly greater velocity than other flow lines, and said guide means and rotor being arranged to direct said greater velocity flow towards the cylinder heads.

4. An engine as claimed in claim 2, including thermostat means controlling the throttle means and sensitive to engine crankcase temperature.

5. An engine as claimed in claim 2, including thermostat means controlling the throttle means and sensitive to engine oil circulation temperature.

6. A multi-cylinder air cooled internal combustion engine having at least one bank of a plurality of cylinders in line with each said cylinder having heat dissipating surfaces thereon, a first and second bladed cylindrical rotor mounted for rotation about a common axis wherein said blades are curved in the direction of rotation, and wherein their outer edges lead their inner edges, vortex forming and stabilizing means associated with each said rotor whereby when said machine is operated vortexes are formed having cores inter-penetrating the path of the rotating blades to cause air to flow into the rotors through the path of the rotating blades from a suction side and thence out of the rotors through the path of the rotating blades to a pressure side, said first rotor extending the length of a bank of cylinders, ducting for carrying the throughput of said first rotor past said heat dissipating surfaces, a common exhaust manifold on one side of the cylinders and extending parallel to the crank shaft, and a duct for carrying the throughoput of said second rotor from said second rotor over said manifold whereby the throughput air is heated.

7. An engine according to claim 6 including means to throttle the throughput of said first rotor.

8. A vehicle engine as claimed in claim 6 wherein the ducting guiding the throughput of the first rotor towards said bank comprises in part a first outer surface portion of the manifold and wherein the duct guides the throughput of the second rotor against a second outer surface portion of the manifold; said manifold having joints at said first surface and being free of joints at said second surface.

References Cited by the Examiner

UNITED STATES PATENTS

| | | | |
|---|---|---|---|
| 1,173,637 | 2/1916 | Bailey | 237—12.3 |
| 1,683,602 | 9/1928 | Brockway | 123—41.61 |
| 1,920,952 | 8/1933 | Anderson | 230—274 |
| 2,175,533 | 10/1933 | Ledwinka | 123—41.65 |
| 2,326,335 | 8/1943 | Dehn | 123—41.65 |
| 2,341,549 | 2/1944 | Helmik | 237—12.3 |
| 2,374,483 | 4/1945 | Hansen | 123—41.65 |
| 2,450,199 | 9/1948 | Leibing | 123—103 |
| 2,525,602 | 10/1950 | Jackson | 123—103 |
| 2,942,773 | 6/1960 | Eck | 230—134.5 |

FOREIGN PATENTS

| | | |
|---|---|---|
| 1,131,367 | 10/1956 | France. |
| 798,176 | 7/1958 | Great Britain. |

MARK NEWMAN, *Primary Examiner.*

RICHARD B. WILKINSON, *Examiner.*